United States Patent
Surace et al.

(10) Patent No.: US 12,352,172 B2
(45) Date of Patent: Jul. 8, 2025

(54) SEAL SLOT WITH COATING

(71) Applicant: Raytheon Technologies Corporation, Farmington, CT (US)

(72) Inventors: Raymond Surace, Newington, CT (US); Robert A. White, III, Meriden, CT (US); Howard J. Liles, Newington, CT (US); Bryan P. Dube, Chepachet, RI (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/071,070

(22) Filed: Nov. 29, 2022

(65) Prior Publication Data

US 2024/0175368 A1    May 30, 2024

(51) Int. Cl.
     *F01D 11/00*      (2006.01)

(52) U.S. Cl.
     CPC .......... *F01D 11/00* (2013.01); *F05D 2230/90* (2013.01); *F05D 2300/603* (2013.01); *F05D 2300/611* (2013.01)

(58) Field of Classification Search
     CPC ............................. F01D 11/00; F05D 2230/90
     See application file for complete search history.

(56) References Cited

U.S. PATENT DOCUMENTS

| | | | |
|---|---|---|---|
| 5,439,348 A | 8/1995 | Hughes et al. | |
| 6,418,618 B1 | 7/2002 | Burdgick | |
| 10,024,175 B2 | 7/2018 | Varney | |
| 10,100,656 B2 * | 10/2018 | Bancheri | F16J 15/0887 |
| 10,113,435 B2 | 10/2018 | Pater | |
| 10,401,028 B2 | 9/2019 | Freeman et al. | |
| 10,458,653 B2 | 10/2019 | Freeman et al. | |
| 10,465,534 B2 | 11/2019 | Freeman et al. | |
| 10,472,976 B2 | 11/2019 | Freeman et al. | |
| 10,934,873 B2 | 3/2021 | Sarawate et al. | |
| 11,143,040 B2 | 10/2021 | McCaffrey et al. | |
| 11,466,585 B2 | 10/2022 | Arbona et al. | |
| 2013/0004320 A1 | 1/2013 | Edmundo et al. | |
| 2016/0298467 A1 * | 10/2016 | Ucasz | C23C 14/083 |
| 2017/0030211 A1 * | 2/2017 | Marin | F01D 11/005 |
| 2017/0058686 A1 | 3/2017 | Bancheri et al. | |
| 2020/0095880 A1 | 3/2020 | Clark et al. | |
| 2020/0141254 A1 | 5/2020 | Sarawate et al. | |
| 2020/0141276 A1 | 5/2020 | Wolfe et al. | |
| 2020/0165713 A1 * | 5/2020 | Venkataramani | C23C 4/185 |
| 2022/0169574 A1 | 6/2022 | Shim et al. | |

FOREIGN PATENT DOCUMENTS

| | | |
|---|---|---|
| DE | 19814442 B4 | 10/2013 |
| EP | 4276285 A1 | 11/2023 |

OTHER PUBLICATIONS

European Search Report for EP Application No. 23211575.8 dated Apr. 17, 2024.

* cited by examiner

*Primary Examiner* — Sabbir Hasan
(74) *Attorney, Agent, or Firm* — Carlson, Gaskey & Olds, P.C.

(57) ABSTRACT

A method of coating a seal slot includes applying a coating to a slot in a component and machining the coating to provide an open height configured to receive a seal. After the machining a surface roughness of the coating is less than about 100 ra. A scaling assembly is also disclosed.

1 Claim, 2 Drawing Sheets

SEAL SLOT WITH COATING

BACKGROUND

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

Various areas of the gas turbine engine include seals. The seals can be metallic or in some examples composite materials such as polymer, metal, and/or ceramic matrix composites ("CMCs"). There is a need for improving the sealing efficiency and physical properties of these seals.

SUMMARY OF THE INVENTION

A method of coating a seal slot according to an exemplary embodiment of this disclosure, among other possible things includes applying a coating to a slot in a component and machining the coating to provide an open height configured to receive a seal. After the machining a surface roughness of the coating is less than about 100 ra.

In a further example of the foregoing, the applying includes filling in the slot with the coating.

In a further example of any of the foregoing, the machining is accomplished by grinding, ultrasonic machining, water guided laser, milling, or reaming.

In a further example of any of the foregoing, the coating includes at least one of rare earth silicates, alkaline earth silicates, alkaline earth aluminosilicates, yttria-stabilized zirconia, alumina-stabilized zirconia, hafnon, zircon, yttria, mullite, titania, chromia, silicon, silicon oxides, silicon carbides, silicon oxycarbides, barium-magnesium aluminosilicate, hafnium oxides, hafnium silicon oxides, alumina-stabilized zirconia, zirconium oxides, yttrium oxides, and combinations thereof.

In a further example of any of the foregoing, the coating includes at least one of hafnon, zircon, and mullite.

In a further example of any of the foregoing, the slot has an open height of at least about 20 mils after machining.

In a further example of any of the foregoing, the component is metallic.

In a further example of any of the foregoing, the component is a composite material.

In a further example of any of the foregoing, the component is a polymer matrix composite, a metal matrix composite, or a ceramic matrix composite.

In a further example of any of the foregoing, the surface roughness of the coating is between about 20 and 100 ra after the machining.

In a further example of any of the foregoing, the surface roughness of the coating is less than about 65 ra after machining.

A sealing assembly according to an exemplary embodiment of this disclosure, among other possible things includes a first component having a first slot, a second component having a second slot corresponding to the first slot, and a seal arranged in the first and second slots between the first component and the second component. The first and second slots include a coating. The coating has a surface roughness less than about 100 ra.

In a further example of the foregoing, the coating includes at least one of rare earth silicates, alkaline earth silicates, alkaline earth aluminosilicates, yttria-stabilized zirconia, alumina-stabilized zirconia, hafnon, zircon, yttria, mullite, titania, chromia, silicon, silicon oxides, silicon carbides, silicon oxycarbides, barium-magnesium aluminosilicate, hafnium oxides, hafnium silicon oxides, alumina-stabilized zirconia, zirconium oxides, yttrium oxides, and combinations thereof.

In a further example of any of the foregoing, the coating includes at least one of hafnon, zircon, and mullite.

In a further example of any of the foregoing, the first and second slots have an open height of at least about 20 mils.

In a further example of any of the foregoing, a ratio of a thickness of the coating to the open width of the first and second slots is less than or equal to about 2.

In a further example of any of the foregoing, the seal is a composite material.

In a further example of any of the foregoing, the seal is a polymer matrix composite, a metal matrix composite, or a ceramic matrix composite.

In a further example of any of the foregoing, a surface of the coating is smoother than a surface of the ceramic matrix composite seal.

In a further example of any of the foregoing, at least one of the first and second components are composites.

In a further example of any of the foregoing, at least one of the first and second components is a polymer matrix composite, metal matrix composite, or ceramic matrix composite.

In a further example of any of the foregoing, the surface roughness of the coating is between about 20 and 100 ra.

In a further example of any of the foregoing, the surface roughness of the coating is less than about 65 ra.

DETAILED DESCRIPTION

Figure 1:
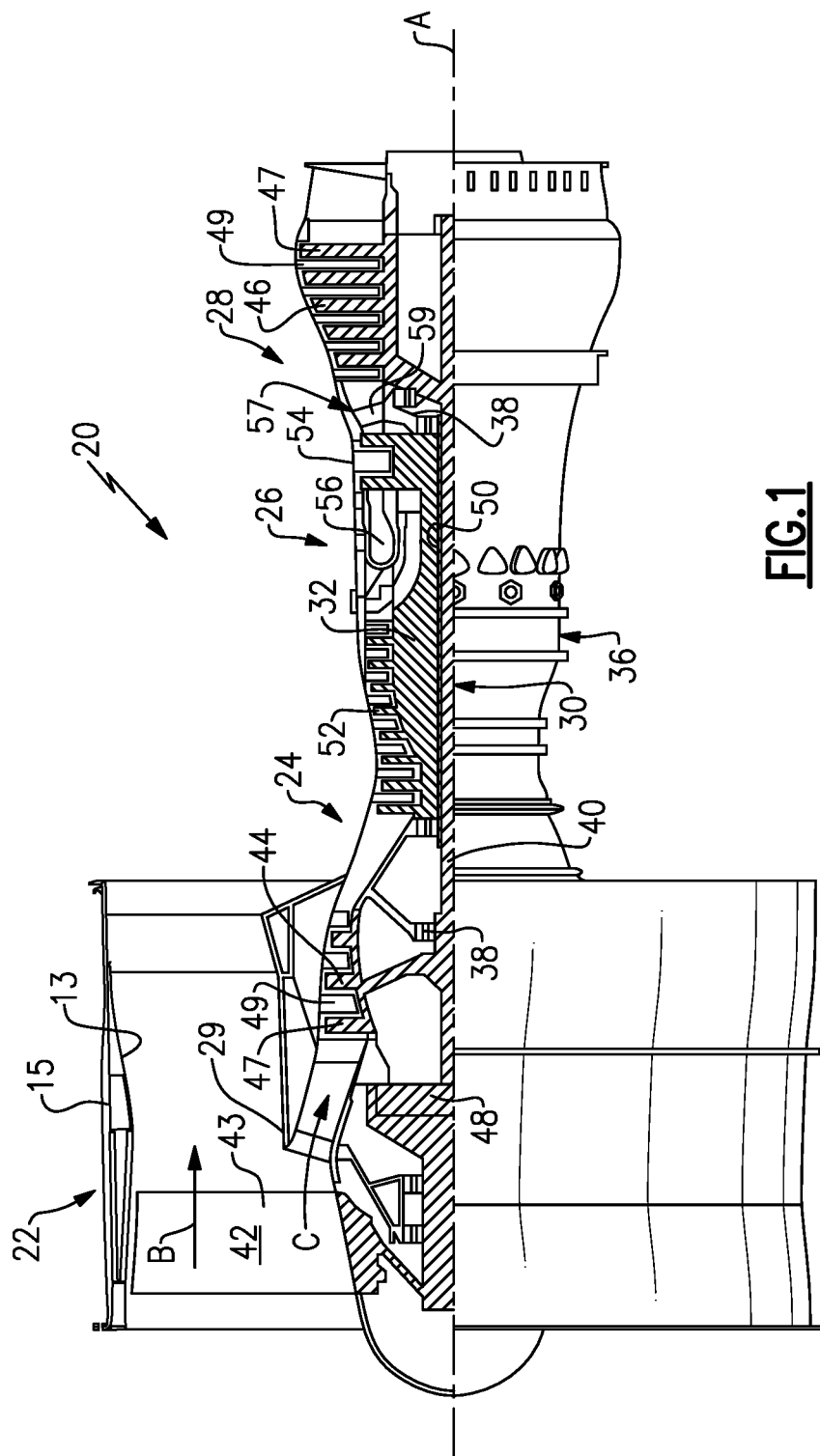
FIG. 1 schematically illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. The engine 20 may incorporate a variable area nozzle for varying an exit area of the bypass flow path B and/or a thrust reverser for generating reverse thrust.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The low pressure compressor 44, high pressure compressor 52, high pressure turbine 54 and low pressure turbine 46 each include one or more stages having a row of rotatable airfoils. Each stage may include a row of vanes adjacent the rotatable airfoils. The rotatable airfoils are schematically indicated at 47, and the vanes are schematically indicated at 49.

The engine 20 may be a high-bypass geared aircraft engine. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above, and those in the next paragraph are measured at this condition unless otherwise specified.

"Fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The fan pressure ratio is a spanwise average of the pressure ratios measured across the fan blade 43 alone over radial positions corresponding to the distance. The fan pressure ratio can be less than or equal to 1.45, or more narrowly greater than or equal to 1.25, such as between 1.30 and 1.40. "Corrected fan tip speed" is the actual fan tip speed in ft/sec divided by an industry standard temperature correction of $[(\text{Tram } ° \text{R})/(518.7° \text{R})]^{0.5}$. The corrected fan tip speed can be less than or equal to 1150.0 ft/second (350.5 meters/second), and can be greater than or equal to 1000.0 ft/second (304.8 meters/second).

Various areas of the engine 20 include seals. For instance, the turbine section 28 may include seals between adjacent platforms of the vanes of the rows of vanes. As another example, the turbine section 28 may include seals between tips of the blades in the rows of blades and engine 20 casing structures, known as blade outer air seals or BOAS. Other examples are also contemplated.

Figure 2:
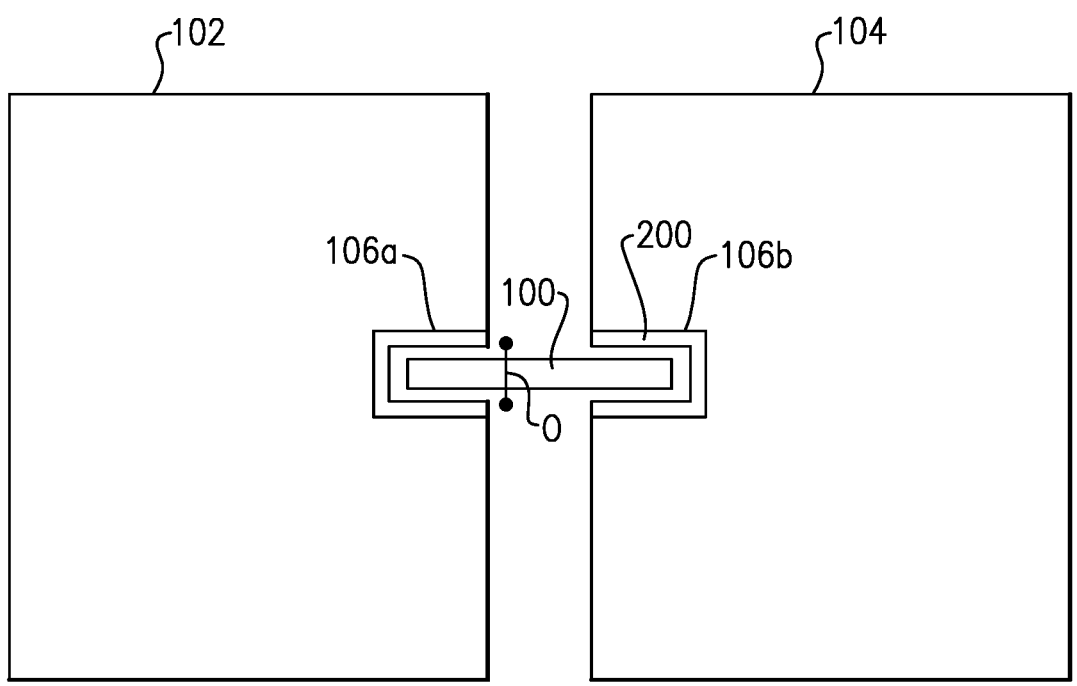
FIG. 2 schematically illustrates a sealing assembly with a slot having a machinable coating.

FIG. 2 schematically illustrates a seal 100 for the engine 20. The seal 100 is generally a thin, flat or approximately flat, and flexible construct sometimes known as a "feather seal" or "mateface seal". The seal 100 seals between two or more components 102/104. The seal 100 is situated in corresponding slots 106a/106b in each of the components 102/104. The components 102/104 can be, for example, part of a vane assembly for vanes in the engine 20. In one example, the seal 100 can be metallic, such as nickel or nickel-based alloy, but in other examples is a ceramic matrix composite ("CMC"). This disclosure will focus on CMC seals 100, but it should be understood that it is not limited to CMC seals. The components 102/104 can also be CMC constructs. CMC are known in the art and will not be described in detail herein, but generally include ceramic-based reinforcements such as fibers (which may be continuous) disposed in a ceramic-based matrix material. In the case of ceramic matrix composite seals, the reinforcements can be two-dimensional/three-dimensional textiles made from unidirectional, woven, braided, knitted, or nonwoven fibers. Other materials such as polymers and metals, and composites, such as polymer matrix composites and metal matrix composite, are also contemplated for the components 102/104.

Ceramic matrix composites are desirable for use as seals 100 and components 102/104 in the engine 20 because they have higher temperature capabilities relative to their metallic counterparts. However, untreated ceramic matrix composites can have poorer surface qualities than their metallic counterparts because of undulations corresponding to the reinforcements at the surface (commonly known as crimp), residual open porosity remaining after infiltrating the matrix material into the reinforcements, and inherent surface roughnesses of the matrix and/or fiber reinforcements. These small and/or large scale surface anomalies can reduce the sealing effectiveness of the seal. In general, a smoother surface can better mate with the surrounding sealing surfaces to provide a better seal. In addition, a smoother surface allows a seal 100 to slide with respect to components 102/104, which can accommodate mismatches in the coefficient of thermal expansion between the seal 100 and components 102/104.

Accordingly, the slots 106a/106b are coated with a machinable coating 200. The coating 200 in one example comprises a silicate that has a coefficient of thermal expansion that is compatible with the coefficient of thermal expansion of the seal 100 and components 102/104. The coating 200 may include includes rare earth silicates, alkaline earth silicates, alkaline earth aluminosilicates, yttria-stabilized zirconia, alumina-stabilized zirconia, mullite, titania, chromia, silicon, silicon oxides, silicon carbides, silicon oxycarbides, barium-magnesium aluminosilicate, hafnium oxides such as hafnon, hafnium silicon oxides, alumina-stabilized zirconia, zirconium oxides such as zircon, yttrium oxides such as yttria, mullite, and combinations thereof. In a particular example, the machinable coating includes at least one of hafnon, zircon, and mullite.

In some examples, a silicon bond coat is disposed between the component 102/104 and the coating 200. In a particular example with a silicon bond coat, the coating 200 is mullite.

In general, the coating 200 has a high density (for example, less than about 5% porosity).

In some examples, the coating 200 provides some thermal resistance to help shield the material of the seal 100 and/or the components 102/104 from high temperatures generated in the engine 20. For instance, in an example where the seal 100 seals between a ceramic component 102 and a metallic component 104, the coating 200 may provide some thermal resistance to the metallic component 104, which may have lower temperature capabilities than the ceramic component 102 and the seal 100 itself.

In the example where the seal 100 seals between a ceramic component 102 and a metallic component 104, or where the seal 100 is ceramic and one or both of the components 102/104 are metallic, the coating 200 may also provide thermochemical insulation between the ceramic component 102 and metallic component 104, or the metallic components 102/104 and the ceramic seal 100, by helping to discourage unwanted chemical reactions between the components 102/104 and/or seal 100.

Further, in some examples, the coating 200 enhances wear characteristics between the seal 100 and the mating component 102/104 to provide a better wear couple and limit degradation between the components 102/104 and the seal 100.

The slots 106a/106b including the coating 200 have an open height O for receiving the seal 200. In general, the open height O is at least about 40 mils. A ratio of a thickness of the coating 200 to the height O is less than or equal to about 2.

The coating 200 may be applied to the slots 106a/106b in any suitable way known in the art, such as air plasma spraying. In one example, the coating 200 is applied such that it initially fills in the entirety of the slots 106a/106b. The coating 200 is cured, dried, heat treated, and/or processed according to its makeup and application method, which are well-known in the art.

The coating 200 is then machined via grinding, ultrasonic machining, water guided laser, milling, reaming or another suitable method. In general, the machining includes removing material of the coating 200 until the desired open height O and coating 200 thickness and profile is achieved. The coating 200 profile may track the profile of the slots 106a/106b or follow its own unique contour. The coating may exist on all sides of the slot 106a/106b, or only certain sides of the slot which are desirable, and/or may only exist on portions of the sides of the slot (e.g., not run the full span of the slot).

After machining, the coating 106/106b leaves a smooth surface. In example, the coating 200 has a surface roughness less than about 100 ra (microinches). In another example, the surface roughness of the coating is between about 20 and 100 ra. In another example, the surface roughness of the coating is less than about 65 ra.

As used herein, the term "about" has the typical meaning in the art, however in a particular example "about" can mean deviations of up to 10% of the values described herein.

Although a combination of features is shown in the illustrated examples, not all of them need to be combined to realize the benefits of various embodiments of this disclosure. In other words, a system designed according to an embodiment of this disclosure will not necessarily include all of the features shown in any one of the figures or all of the portions schematically shown in the figures. Moreover, selected features of one example embodiment may be combined with selected features of other example embodiments.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:
1. A method of coating a seal slot, comprising:
1) Applying a coating to a slot in a first component;
2) machining the coating to provide an open height configured to receive a seal, such that a ratio of a thickness of the coating to the open height is less than or equal to about 2, and wherein after the machining a surface roughness of the coating is less than about 100 ra; and wherein a ceramic seal is positioned in the slot in the first component;
forming a slot in a second component using steps 1) and 2), and putting the ceramic seal in the slot in the second component;
the first component is formed of a ceramic material and the second component is formed of a metallic material;
wherein the coating has a porosity of less than about 5%; and
wherein the applying of step 1) includes filling in the entirety of the slot with the coating and then machining the coating of step 2) to reach the open height.

\* \* \* \* \*